(12) United States Patent
Suga

(10) Patent No.: US 6,707,467 B1
(45) Date of Patent: Mar. 16, 2004

(54) IMAGE PROCESSING APPARATUS AND METHOD

(75) Inventor: Kazumi Suga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/458,192

(22) Filed: Dec. 9, 1999

(30) Foreign Application Priority Data

Dec. 15, 1998 (JP) .............................. 10-356107

(51) Int. Cl.⁷ .............................. G09G 5/02; G09G 5/00; G06K 9/32
(52) U.S. Cl. .................. 345/698; 345/3.3; 382/299; 382/300
(58) Field of Search .............................. 345/698, 699, 345/3.1, 3.2, 3.3, 3.4; 382/299, 300, 298; 348/333.11, 558, 573, 574; 358/1.2, 3.07, 525; 341/131

(56) References Cited

U.S. PATENT DOCUMENTS

| | | | | |
|---|---|---|---|---|
| 5,008,752 A | * | 4/1991 | Van Nostrand | 348/581 |
| 6,157,749 A | * | 12/2000 | Miyake | 382/300 |
| 6,219,465 B1 | * | 4/2001 | Nacman et al. | 382/300 |
| 6,226,421 B1 | * | 5/2001 | Monji | 382/300 |
| 6,263,120 B1 | * | 7/2001 | Matsuoka | 382/300 |
| 6,348,931 B1 | * | 2/2002 | Suga et al. | 345/698 |

* cited by examiner

Primary Examiner—Paul Bell
(74) Attorney, Agent, or Firm—Robin, Blecker & Daley

(57) ABSTRACT

An image processing apparatus obtains, on the basis of information of input resolution of input image data and information of output resolution to be obtained after transformation of resolution, a ratio of the input resolution to the output resolution as an integral ratio M:N having no common divisor, decides, in units of the N number of pixels of output image data, which of a first resolution transforming process and a second resolution transforming process is to be used for each of the N number of pixels of output image data, and performs the first resolution transforming process and the second resolution transforming process on the input image data on the basis of a result of this decision, to obtain the output image data.

35 Claims, 12 Drawing Sheets

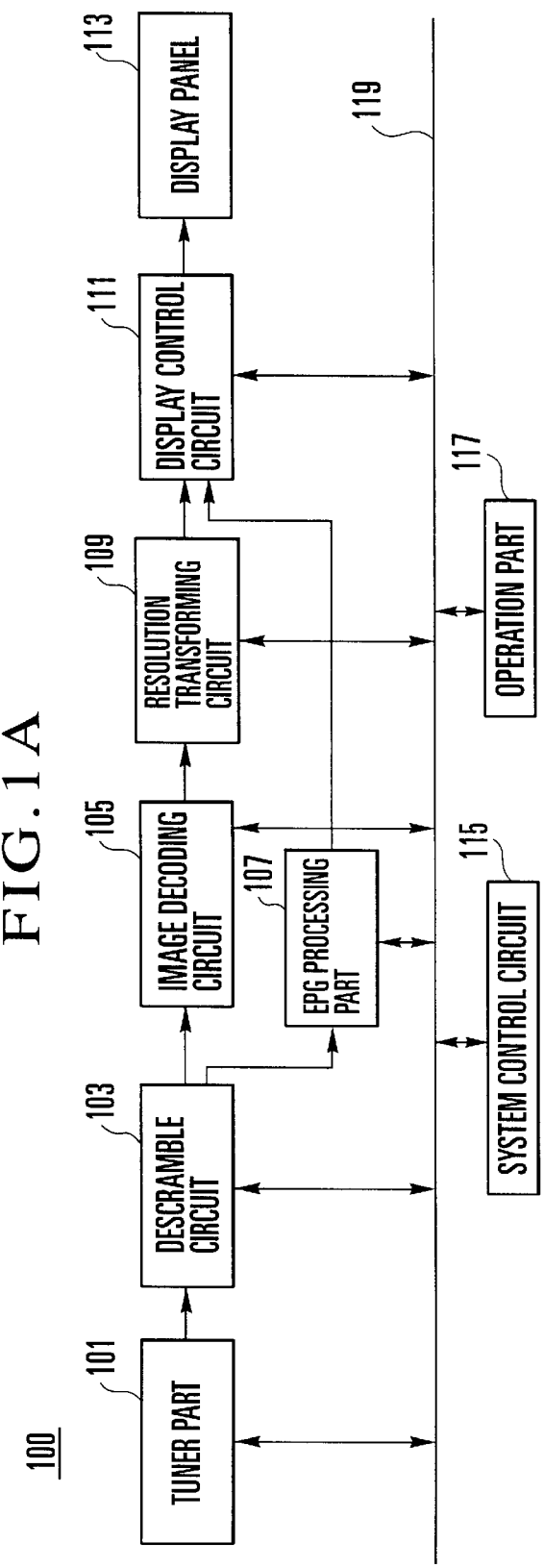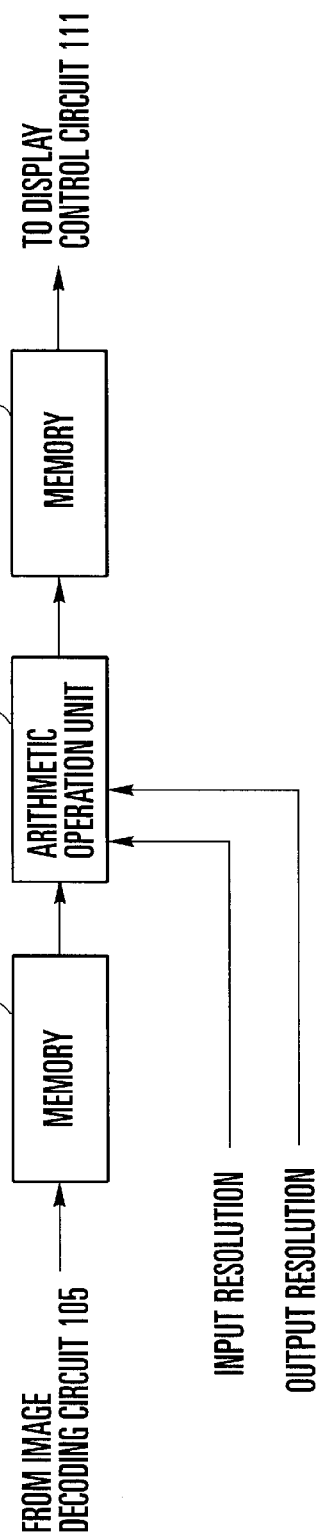

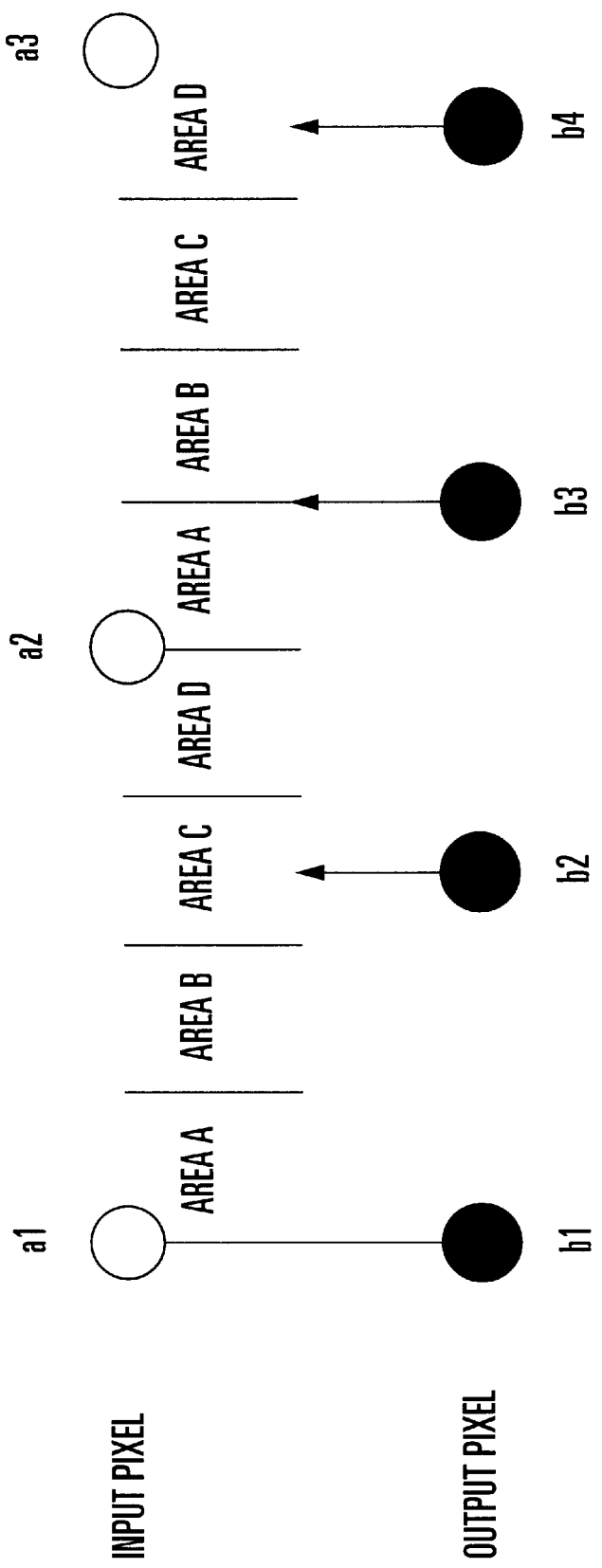

IMAGE PROCESSING APPARATUS AND METHOD

BACKGROUND OF THE INVENTION

1. Field of the Invention

The present invention relates to an image processing apparatus and an image processing method, and more particularly, to a resolution transforming process for image data.

2. Description of Related Art

As a display device for a computer apparatus such as a personal computer and a workstation, or a display device for television broadcast conforming to the NTSC system or PAL system, the so-called CRT display device of the raster scan type is widely used at present. However, in view of space saving, energy conservation, ergonomics and the like, a flat panel display device such as a liquid crystal panel(LCD) and a plasma display panel(PDP) is recently noticed widely.

A video signal, which is composed of analog image data and vertical and horizontal sync signals or a composite signals of them, is used for connecting a host computer apparatus to the CRT display device. The video signal has an extremely large number of specifications and, in particular, a video signal for use in some personal computers has a plurality of resolutions. For instance, among IBM PC/AT-compatible computers, etc., there is equipment capable of displaying an image on the basis of resolutions such as "320×200", "640×400", "720×400", "640×350", "640×480", "800×600", "1024×768" and "1280×1024".

On the contrary, among the CRT display devices, there is what is called a multi-sync CRT display device, which is arranged to cope with a plurality of resolutions by measuring a sync signal of the video signal and matching the driving period and the amplitude of a scanning line with those of the sync signal of the video signal. In this occasion, video signals or sync signals for some host computers have been measured in advance, and the measured results are stored in a memory in the CRT display device as display parameters. In the case where the host computer can be specified upon measuring the sync signal, the display parameters in the memory are used, so as to provide a display including the display position of the image with higher precision.

A current dot-matrix display device such as a liquid display panel or plasma display panel is suitable to a display control operation by a digital signal. Therefore, there are many cases of adopting a method whereby an inputted analog image signal is A/D-converted once and, thereafter, is displayed. In this occasion, it can be said "according to the performance of the current dot-matrix display device, that is, one pixel thereof is larger as compared with a shadow mask of the CRT display device, so that it is difficult to control sampling in the horizontal direction". Therefore, generally, one pixel of the video signal is sampled correspondingly to one pixel of the display panel to be displayed.

Accordingly, there is needed a resolution transforming process for video signal by an interpolating or decimating process in the case of displaying a video signal having a low resolution on a dot-matrix display device having a high resolution, or displaying a video signal having a high resolution on a dot-matrix display device having a low resolution.

On the other hand, in the U.S.A., a digital television broadcast using a ground wave started in the autumn of 1998. ATSC (Advanced Television Systems Committee) has specified 18 kinds of image formats as an image format of the digital television broadcast. According to the specified image formats, there are the image formats whose number of scanning lines and number of pixels in the horizontal direction are "1080×1920", "720×1280", "480×704", and "480×640". As for the scanning system, there are the image formats of "60I"(numeral indicates a rewriting frequency and "I" indicates interlaced scanning), "30P"("P" indicates sequential scanning), "24P", and "60P". By combination of the resolution and the scanning system, 18 kinds of image formats are specified.

However, ABC, NBC, and CBS broadcasts as three big television networks in the U.S.A. have determined adoption of different image formats of "720P", "1080P", and "1080I", respectively, in an HDTV (High definition television) broadcast whose aspect ratio is 16:9. Consequently, in order to display each of the digital television broadcasts having a plurality of image formats as mentioned above on the whole effective display picture plane of the dot-matrix display device based on a fixed resolution, the resolution transforming process for video signal by the interpolating or decimating process is needed.

As for the resolution transforming method, generally, there are exemplified methods such as a nearest neighbor interpolation method, a linear interpolation method, and a cubic convoluting interpolation method, using an FIR filter. According to the nearest neighbor interpolation method, input data located at the position nearest to an interpolated position is set to interpolation data. According to the linear interpolation method, a value which is obtained by linear calculation utilizing a distance as a parameter from input data located on both sides of an interpolated position (at the time of interpolation in the horizontal direction) is set to interpolation data. According to the cubic convoluting interpolation method, the sum of products of input data serving as total four pixels of each of two pixels on both sides of an interpolated position (at the time of interpolation in the horizontal direction) and a value of a cubic function utilizing a distance from the interpolated position to each input data as parameters is set to interpolation data.

However, in a case where the nearest neighbor interpolation method is used for a line drawing image such as text, the line width of the text is not made constant, so that the image quality after resolution transformation is degraded. In a case where the linear interpolation method or the cubic convoluting interpolation method is used for the line drawing image such as text, a high-frequency component in the line drawing portion such as text is lost, so that blur is caused in the image quality after resolution transformation.

To solve such problems, for example, there has been proposed a method as disclosed in Japanese Laid-Open Patent Application No. Hei 6-152938, in which an interpolating coefficient having low-pass characteristics and an interpolating coefficient having high-pass characteristics are switched over according to a difference value of video signals at two pixels to be subjected to interpolation.

According to the above-mentioned proposed method, an edge portion of an image is interpolated by using a high-pass filter. However, contrast is decreased as compared with the original data or with contrast by the nearest neighbor interpolation method. Further, the resolution transformation based on the proposed method is executed to enlargement only.

BRIEF SUMMARY OF THE INVENTION

It is an object of the invention to solve the above-stated problems.

It is another object of the invention to execute a resolution transforming process capable of obtaining an image with high definition.

It is a further object of the invention to execute a resolution transforming process at an arbitrary magnification irrespective of enlargement and reduction while reducing blur and ununiformity of the line width such as text.

To solve the above-stated problems and attain the above-stated objects, in accordance with an aspect of the invention, there is provided an image processing apparatus for transforming resolution of input image data and outputting the resolution-transformed image data, the image processing apparatus comprising deciding means for deciding, on the basis of information of input resolution of input image data and information of output resolution to be obtained after transformation of resolution, which of a first resolution transforming process and a second resolution transforming process is to be used for each pixel of output image data, and resolution transforming means for performing a resolution transforming process on the input image data on the basis of a result of decision made by the deciding means, wherein the resolution transforming means performs the first resolution transforming process and the second resolution transforming process on the basis of the result of decision made by the deciding means when the output resolution is larger than the input resolution, and the resolution transforming means performs the second resolution transforming process irrespective of the result of decision made by the deciding means when the input resolution is larger than the output resolution.

The above and further objects and features of the invention will become apparent from the following detailed description of preferred embodiments thereof taken in connection with accompanying drawings.

BRIEF DESCRIPTION OF THE SEVERAL VIEWS OF THE DRAWING

FIGS. 1A and 1B are diagrams showing the arrangement of a digital television (TV) to which the invention is applied.

FIG. 14 is a diagram showing the manner of an interpolating process according to the third embodiment of the invention.

DETAILED DESCRIPTION OF THE INVENTION

Figure 2:
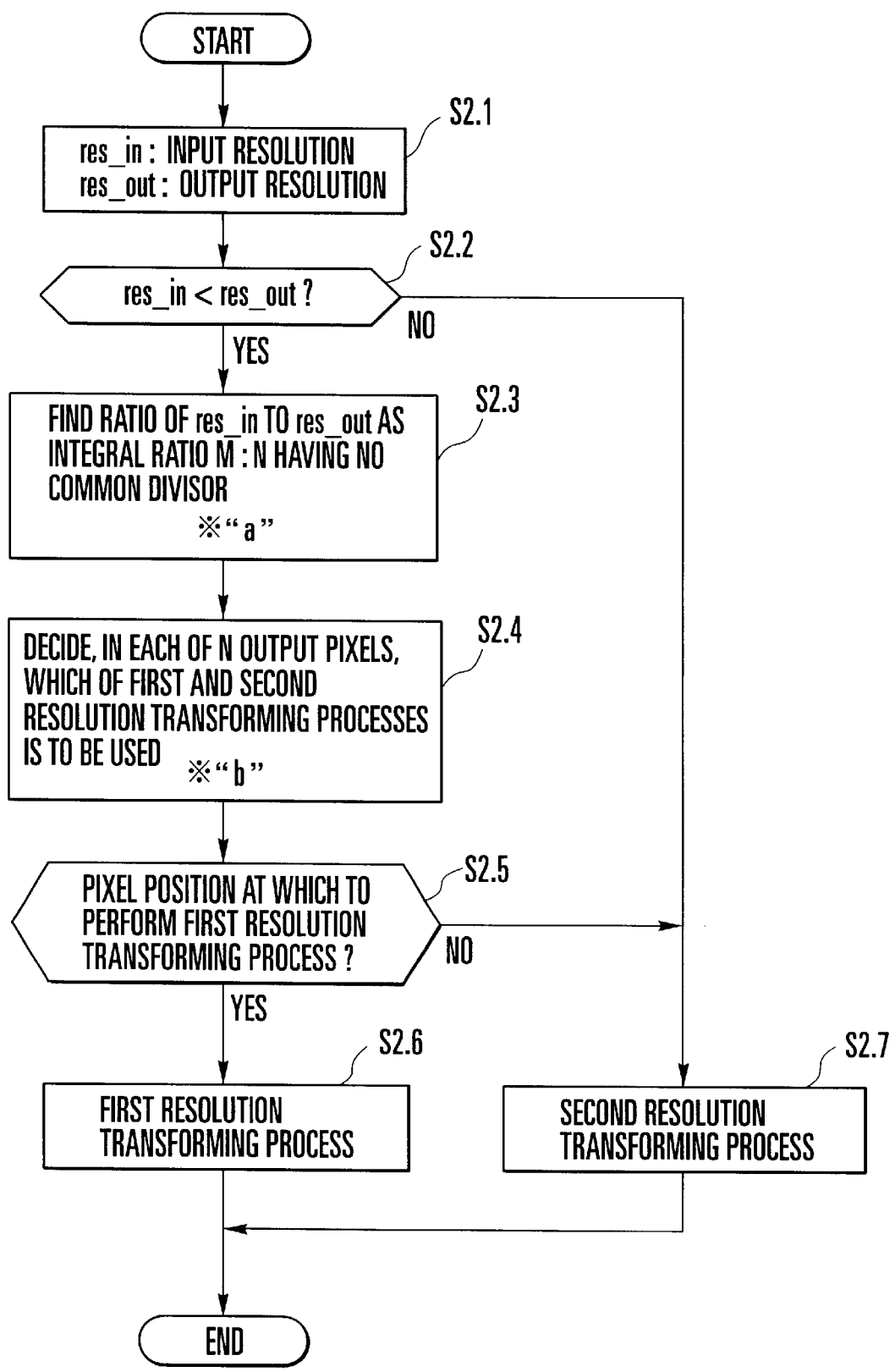
FIG. 2 is a flow chart showing a resolution transforming process according a first embodiment of the invention.

Hereinafter, preferred embodiments of the invention will be described in detail with reference to the drawings.

In the embodiments of the invention, which will be described hereinbelow, the case where the invention is applied to an apparatus for receiving the above-mentioned digital broadcast (hereinafter, referred to as a digital TV) will be explained.

First Embodiment

FIG. 1A is a diagram showing the arrangement of the entirety of a digital TV 100 according to a first embodiment of the invention.

Referring to FIG. 1A, a tuner part 101 receives a television broadcasting wave designated by the user, and outputs the received signal to a descramble circuit 103.

The descramble circuit 103 converts an output signal of the tuner unit 101 into an original digital signal and, further, detects a PID (Packet ID) multiplexed in the digital signal. Then, the descramble circuit 103 detects a table such as a PMT (Program Map Table) or PAT (Program Association Table) on the basis of the PID, detects a desired program on the basis of the table, and outputs image data of the program to an image decoding circuit 105. Further, the descramble circuit 103 extracts EPG (Electronic Program Guide) data from the input digital signal on the basis of the PID and outputs the extracted EPG data to an EPG processing part 107.

All the image data received in the digital TV 100 are image data encoded in a transport stream format based on MPEG (Moving Picture coding Expert Group) 2. The image decoding circuit 105 decodes such encoded image data and outputs the decoded image data to a resolution transforming circuit 109.

The resolution transforming circuit 109 transforms a resolution of the decoded image data outputted from the image decoding circuit 105, as will be mentioned hereinafter, on the basis of a resolution (the number of pixels) of the received image data and a resolution (the umber of pixels) of a display panel 113, and outputs the resolution-transformed image data to a display control circuit 111.

The EPG processing part 107 decodes the EPG data outputted from the descramble circuit 103, forms an EPG picture on the basis of the contents of the decoded EPG data, and outputs image data indicative of the EPG picture to the display control circuit 111.

The display control circuit 111 multiplexes the image data outputted from the resolution transforming circuit 109 and the EPG image data outputted from the EPG processing part 107 and outputs multiplexed image data to the display panel 113, or selectively outputs them to the display panel 113. The display control circuit 111 also controls driving of the display panel 113. It should be noted that in the present embodiment, a flat panel display device such as a liquid crystal display (LCD) or plasma display panel (PDP) is used as the display panel 113.

A system control circuit 115 controls each part of the apparatus in accordance with an instruction by an operation part 117. Also, the system control circuit 115 receives information of resolution of the input image data (input resolution) received from the descramble circuit 103. Then, the system control circuit 115 outputs, to the resolution transforming circuit 109, information of resolution of the display panel 113 (output resolution) stored in a built-in ROM and the information of input resolution. The resolution transforming circuit 109 transforms the resolution of the input image data on the basis of the information of input resolution and the information of output resolution.

In addition, circuits and parts in the apparatus are mutually connected by a data bus and system bus 119.

Next, a resolution transforming process by the resolution transforming circuit 109 shown in FIG. 1A will be described in detail.

FIG. 1B is a block diagram showing an example of the arrangement of the resolution transforming circuit 109 shown in FIG. 1A.

Referring to FIG. 1B, the resolution transforming circuit 109 is composed of a memory 201 for storing input image data from the image decoding circuit 105, an arithmetic operation unit 203 for executing a resolution transforming process for the input image data, and a memory 205 for storing image data obtained by the arithmetic operation unit 203 after the resolution transforming process.

Next, the resolution transforming process to be performed in the arithmetic operation unit 203 will be explained by using flow charts of FIGS. 2 to 4 and a conceptual diagram of FIG. 5.

<Whole Flow>

Referring to FIG. 2, the resolution of the input image data (input resolution) stored in the memory 201 and the output resolution after the resolution transforming process are obtained from the system control circuit 115. Then, the input resolution and the output resolution are stored as "res__in" and "res__out", respectively (step S2.1, "step" is omitted hereinlater). Next, the output resolution is compared with the input resolution (S2.2). If the output resolution is larger than the input resolution (at the time of enlargement), the ratio of "res__in" to "res__out" is obtained as an integral ratio "M:N" having no common divisor (S2.3). It is noted that this process will be explained in detail as a process "a" later on.

Next, it is decided which of a first resolution transforming process and a second resolution transforming process is to be used, in each of N output pixels (S2.4). This process will be explained in detail as a process "b" later on.

If it is decided, in the above-explained deciding process (S2.4), that the output pixel is located at a pixel position where the first resolution transforming process is to be used, the first resolution transforming process is performed (S2.5 and S2.6).

If it is decided, in the above-explained deciding process (S2.4), that the output pixel is located at a pixel position where the second resolution transforming process is to be used, or if the output resolution is not larger than the input resolution (at the time of reduction), the second resolution transforming process is performed (S2.5 and S2.7).

<Process "a">

The process "a" in which the ratio of the input resolution to the output resolution is obtained as an integral ratio having no common divisor will be now described with reference to FIG. 3.

According to the process "a", for example, in a case where the input resolution and the output resolution are "480" and "768", respectively, the ratio of the input resolution to the output resolution is obtained as an integral ratio of "5:8" having no common divisor. Briefly describing, a value obtained by dividing the output resolution by the input resolution ("1.6" in the above example, and hereinlater, referred to as "S") is sequentially multiplied by an integer (hereinlater, referred to as "N") in the order of increasing N, starting with 1. When the product obtained by that multiplication (hereinlater, referred to as "C") has become an integer, the value N at this time is set to an integer corresponding to the input resolution and the value C at this time is set to an integer corresponding to the output resolution, thereby obtaining the ratio of the input resolution to the output resolution as an integral ratio having no common divisor.

The detailed description of the process is as follows.

Figure 3:
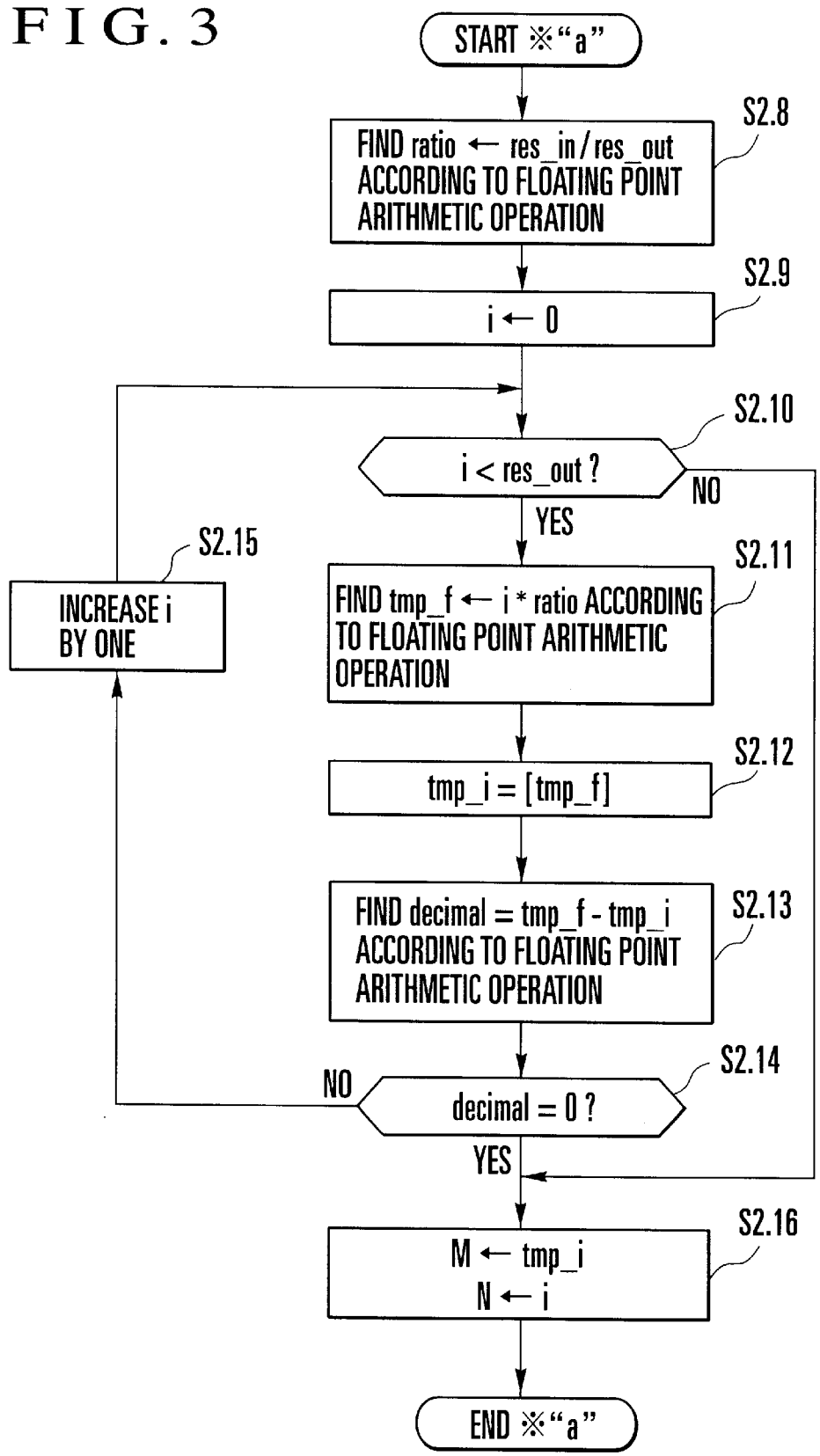
FIG. 3 is a flow chart showing the resolution transforming process according to the first embodiment of the invention.

Referring to FIG. 3, first, "res__out" is divided by "res__in" in accordance with the floating-point arithmetic operation, thereby obtaining the quotient (referred to as "ratio") (S2.8). Next, a counter "i" is cleared to "0" (S2.9). Then, the following processes (a) to (d) are repeated until "i" becomes "res__out" or more (S2.10).

(a) The product of "i" and "ratio" is obtained in accordance with the floating-point arithmetic operation (referred to as "tmp__f", S2.11).

(b) Figures below the decimal point of "tmp__f" are omitted, thereby obtaining an integer value (referred to as "tmp__i", S2.12).

(c) A difference value between "tmp__f" and "tmp__i" is obtained in accordance with the floating-point arithmetic operation (referred to as "decimal", S2.13).

(d) Unless "decimal" is equal to "0", the counter "i" is increased by "1" (S2.15).

If the counter "i" has become larger than "res__out" (S2.10), or if "decimal" in the above operation (d) is equal to "0" (S2.14), "tmp__i" and "i" are set to "M" and "N", respectively, so as to obtain an integral ratio "M:N" (S.16).

<Process "b">

The process "b" of deciding which of the first resolution transforming process and the second resolution transforming process is to be used, in each of N output pixels (output period), will be now described with reference to FIGS. 4 and 5.

Figure 5:
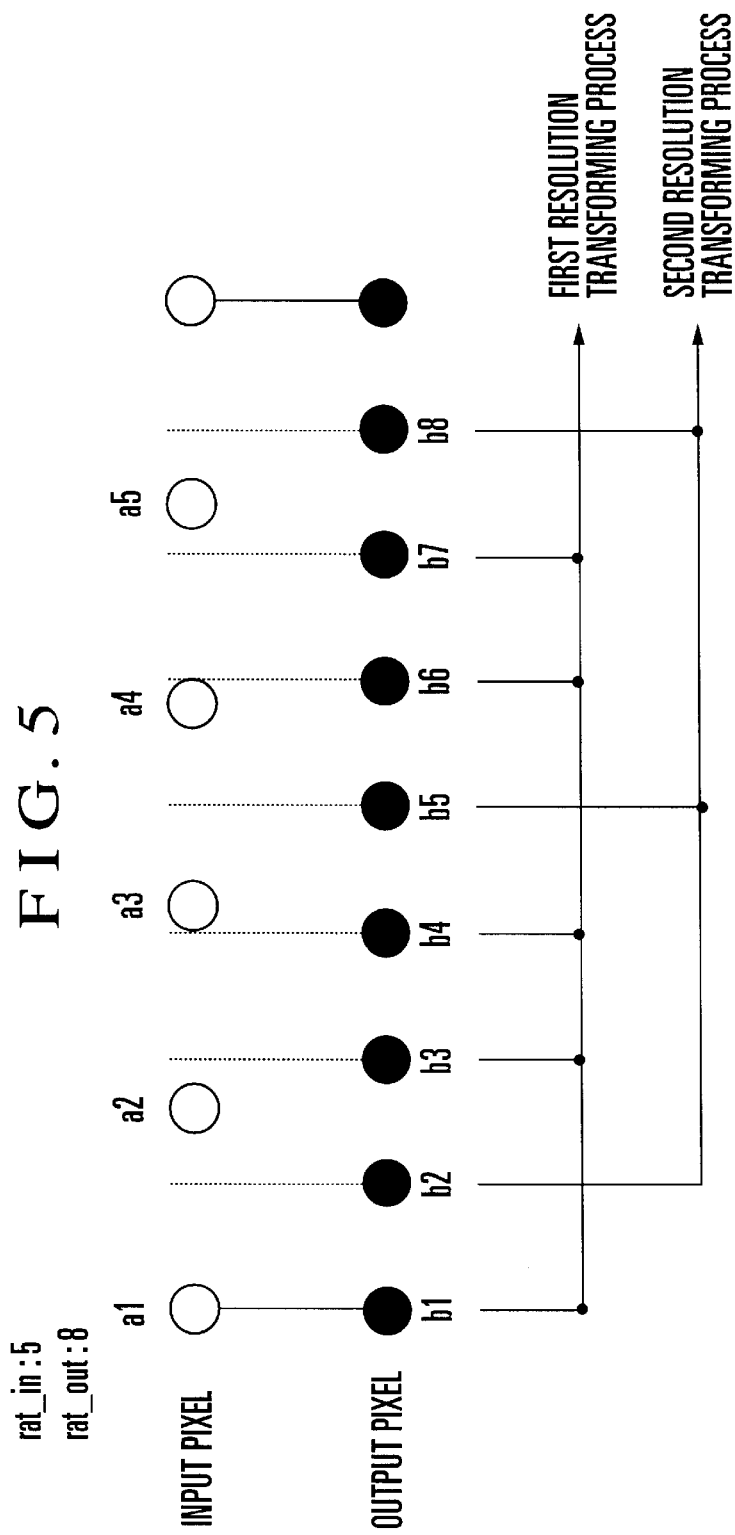
FIG. 5 is a diagram showing the manner of an interpolating process.

First, the gist of the process "b" will be mentioned by using a conceptual diagram of FIG. 5.

Referring to FIG. 5, a1 to a5 denote input pixels and b1 to b8 denote output pixels. In this process, when an interpolation pixel (output pixel) "b" is located near an input pixel "a", it is determined that the interpolation pixel "b" is a pixel on which the first resolution transforming process is to be performed. Contrarily, when the interpolation pixel "b" is located near a middle position between the input pixels "a" (for example, a1 and a2), it is determined that the interpolation pixel "b" is a pixel on which the second resolution transforming process is to be performed.

Further, in this process, in a case where the above value N indicates the output period, M pixels among N pixels after resolution transformation are processed by the first resolution transforming process, and N–M pixels are processed by the second resolution transforming process. In the example shown in FIG. 5, it is determined that five output pixels b1, b3, b4, b6, and b7 are subjected to the first resolution transforming process and three output pixels b2, b5, and b8 are subjected to the second resolution transforming process.

As will be explained later, the first resolution transforming process is a nearest neighbor interpolation method whereby inputted original data is stored as it is. In an enlarging process, a value of input data (all of the five input pixels in the example shown in FIG. 5) is used as it is as much as possible. Therefore, blur of the image in the enlarging process can be decreased. As will be mentioned later, the second resolution transforming process is based on a general FIR filtering process using the linear interpolation method or a cubic function. In the second resolution transforming process, an interval between pixels in which a high-frequency component is stored by the first resolution transforming process is smoothly interpolated.

The deciding process "b" will be now mentioned in detail hereinbelow.

Figure 4:
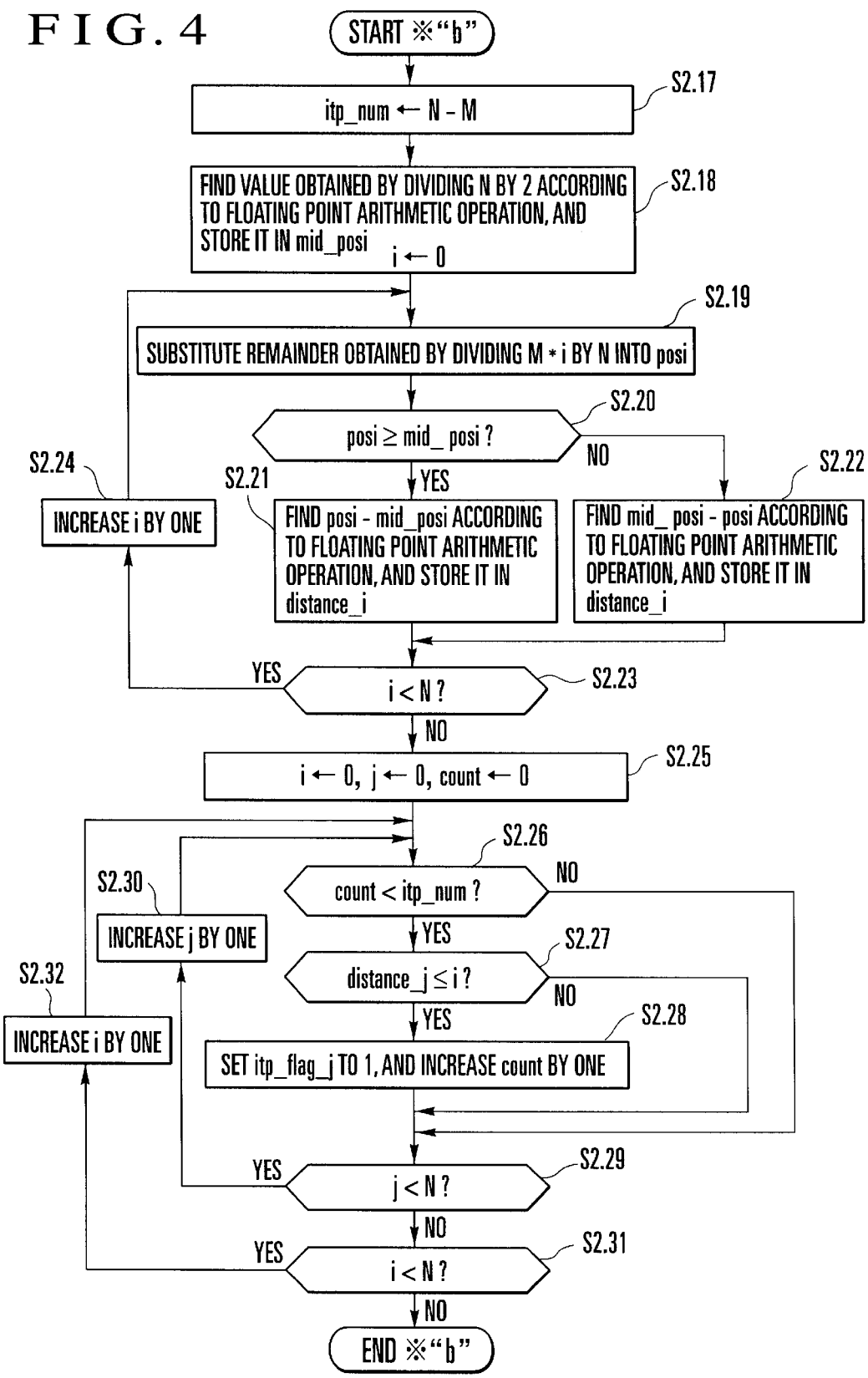
FIG. 4 is a flow chart showing the resolution transforming process according to the first embodiment of the invention.

Referring to FIG. 4, a difference value between N and M is obtained (referred to as "itp_num", S2.17). Next, the quotient is obtained by dividing N by "2" in accordance with the floating-point arithmetic operation (referred to as "mid_posi", S2.18). Then, the following processes (a) to (c) are repeated until "i" becomes N or more (S2.23). Accordingly, the distance between each of N output pixel positions and the middle position between the input pixels located on both sides of that output pixel position is obtained, respectively (stored in "distance_i").

(a) A remainder is obtained by dividing the product of M and "i" by N (referred to as "posi", S2.19).

(b) An absolute value of a difference between "posi" and "mid_posi" is obtained in accordance with the floating-point arithmetic operation (referred to as "distance_i", and, herein, an index "i" denotes an integer value and lies within a range from 0 to N, S2.20 to S2.22).

(c) Unless "i" is larger than N, "i" is increased by "1", and the processing routine returns to the above operation (a) (S2.24).

Then, counters "i", "j", and "count" are cleared to "0" (S2.25).

Next, steps S2.26 to S2.32 are repeated until the counter "count" becomes equal to "itp_num". "itp_num" pixels having a small value of "distance_i" are selected in the order of a smaller value of "distance_i". The thus-selected pixels are decided as pixels to be subjected to the second resolution transforming process. In this instance, the second resolution transforming process is performed on a pixel located at the position where "itp_flag_j" is set to "1".

After the resolution transforming process is decided as mentioned above in each of N output pixels, the following resolution transforming processes are executed using the input pixel data.

<First Resolution Transforming Process>

The first resolution transforming process will be now described. To simplify the description, one-dimension of a horizontal direction or vertical direction will be explained with reference to FIG. 6.

As the first resolution transforming processing method, the nearest neighbor interpolation method is used.

According to the nearest neighbor interpolation method, an input pixel which is located nearest to an output pixel is set to an interpolation pixel.

Figure 6:
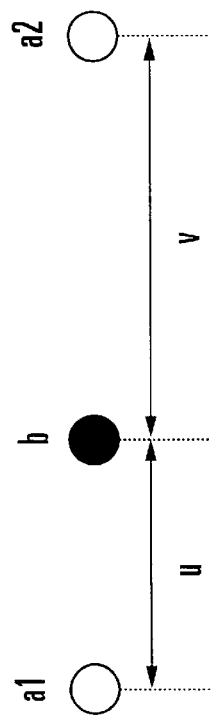
FIG. 6 is a diagram showing the manner of an interpolating process.

Referring to FIG. 6, such a case is considered that a pixel "b" is interpolated to the position (between pixels a1 and a2) which is at distances of "u" and "v" from the input pixels a1 and a2, respectively, which are aligned at a distance interval of 1.

If "u" is smaller than "v", the input pixel a1 is used as the interpolation pixel "b". If "u" is equal to "v" (the resolution transforming ratio is an integral multiple), the front input pixel a1 is used as the interpolation pixel "b". Of course, the rear input pixel a2 may be used.

Here, as shown in FIG. 5, such a case will be described that the resolution is multiplied by 8/5 (enlargement), thereby transforming the resolution, as an example.

In this example, output data of 8 pixels is formed from input data of 5 pixels. Therefore, pixel data "bn" after resolution transformation by the nearest neighbor interpolation method is obtained by the following formulae (1) while using input data "an".

$$b8n+1=a5n+1 (n=0, 1, 2 \ldots)$$
$$b8n+2=a5n+2$$
$$b8n+3=a5n+2$$
$$b8n+4=a5n+3$$
$$b8n+5=a5n+3$$
$$b8n+6=a5n+4$$
$$b8n+7=a5n+5$$
$$b8n+8=a5n+5 \qquad (1)$$

Figure 7:
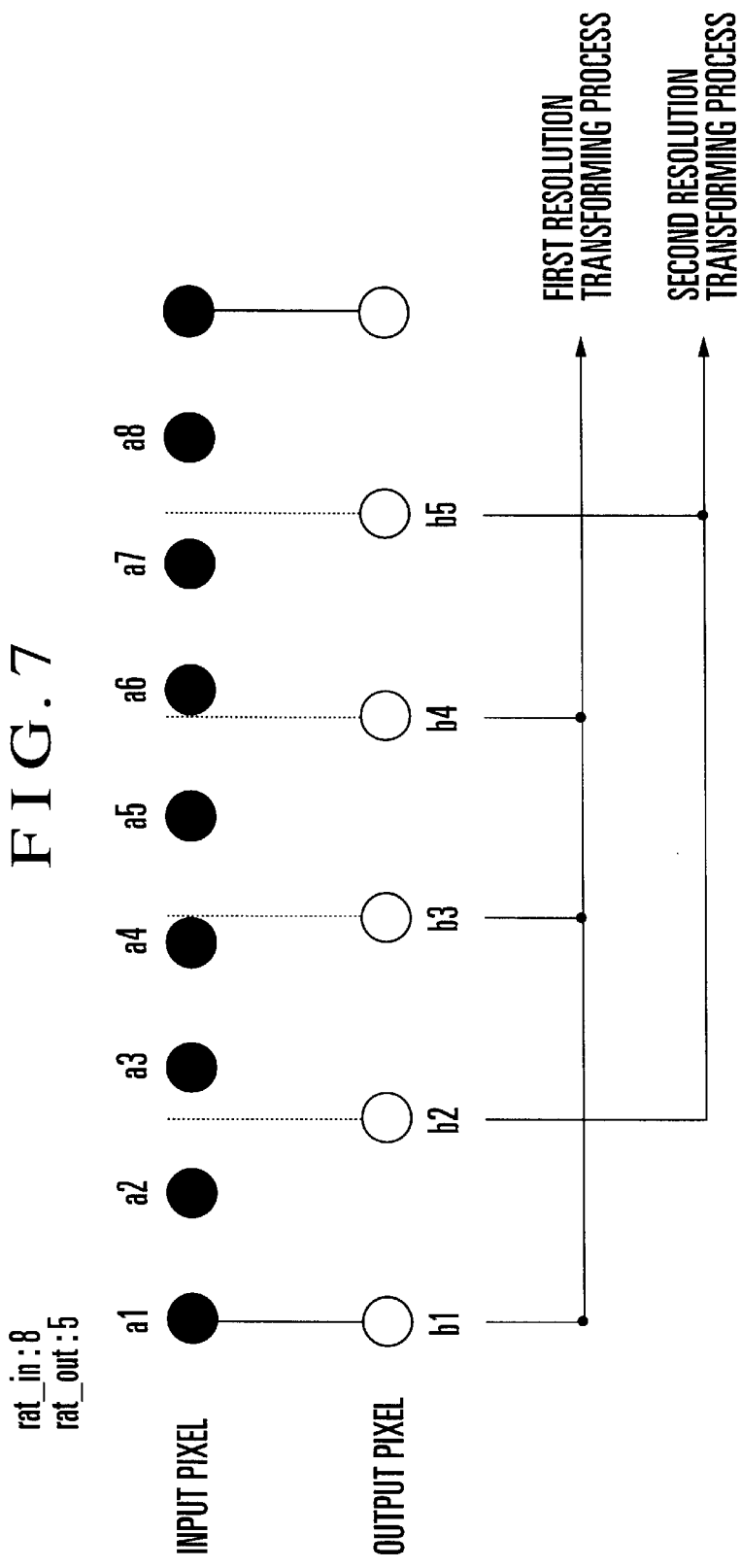
FIG. 7 is a diagram showing the manner of an interpolating process.

Further, as shown in FIG. 7, such a case will be also described that the resolution is multiplied by 5/8 (reduction), thereby performing the resolution transformation.

In this example, output data of 5 pixels is formed from input data of 8 pixels. Therefore, pixel data "bn" after resolution transformation by the nearest neighbor interpolation method is obtained by the following formulae (2) while using input data "an".

$$b5n+1=a8n+1 (n=0, 1, 2 \ldots)$$
$$b5n+2=a8n+3$$
$$b5n+3=a8n+4$$
$$b5n+4=a8n+6$$
$$b5n+5=a8n+7 \qquad (2)$$

<Second Resolution Transforming Process>

Next, the second resolution transforming process will be now described. To simplify the description, one-dimension of a horizontal direction or vertical direction will be explained with reference to FIGS. 6 and 8.

As the second resolution transforming processing method, there is adopted a method of obtaining interpolation position data by using the FIR filter employed to the linear interpolation method and the cubic convoluting interpolation method.

According to the linear interpolation method, pixel data of an interpolation pixel is obtained by using pixel data of pixels existing on both sides of a pixel to be interpolated. As shown in FIG. 6, such a case is considered as an example that the pixel "b" is interpolated to the position (between the pixel a1 and a2) which is at distances of "u" and "v" from the input pixels a1 and a2, respectively, which are aligned at a distance interval of 1. In this case, pixel data of the pixel "b" is obtained by the following formula (3).

$$b=a1*v/(u+v)+a2*u/(u+v) \qquad (3)$$

On the other hand, according to the cubic convoluting interpolation method, pixel data of each of two pixels on each of the both sides of a pixel to be interpolated and the cubic convolution function (cubic function) are used, thereby obtaining image data of the interpolation pixel. A cubic convolution function f is obtained by executing a windowing function process for a sine function obtained by the following formula (4) so that the sine function is separated by five-tap areas of an interpolation pixel and two pixels aligned on each of the both sides at a distance interval of 1.

$$f(t)=\sin(\Pi t)/(\Pi t) \quad (4)$$

Accordingly, the cubic convolution function f is obtained in accordance with a range of a distance t between the interpolation pixel position and each of two pixels on each of the both sides of the interpolation pixel, by following formulae (5), (6), and (7).

$$f(t)=1-2*|t|^2+|t|^3 (0\leq|t|<1) \quad (5)$$

$$f(t)=4-8*|t|+5*|t|^2-|t|^3 (1\leq t<2) \quad (6)$$

$$f(t)=0 (2\leq|t|) \quad (7)$$

Figure 8:
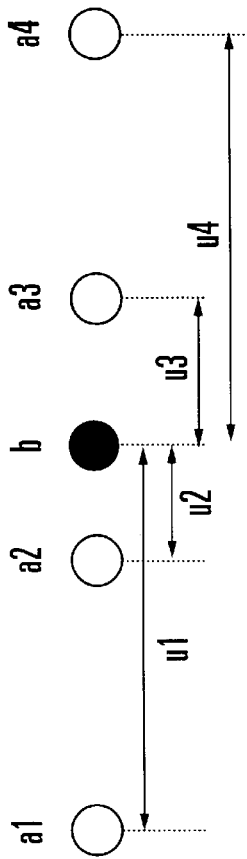
FIG. 8 is a diagram showing the manner of an interpolating process.

As shown in FIG. 8, such a case is considered as an example that the pixel "b" is interpolated to the position which is at distances of "u1", "u2", "u3" and "u4" from the pixels a1, a2, a3, and a4, respectively, which are aligned at a distance interval of 1 (the position between the pixel a2 and a3). In this case, pixel data of the pixel "b" is obtained by the following formula (8) according to the cubic convolution function f.

$$b=a1*(4-8*u1+5*u1^2-u1^3)+a2*(1-2*u2^2+u2^3)+a3*(1-2*u3^2+u3^3)+a4*(4-8*u4+5*u4^2-u4^3) \quad (8)$$

There will be now explained the case of performing the resolution transforming process for 768 to 960 pixels as an example by using the foregoing formulae (3) and (8) according to the linear interpolation method (first-degree interpolation method) and the cubic convoluting interpolation method.

In this case, output data of 5 pixels are formed from input data of 4 pixels. Therefore, pixel data "bn" after linear interpolation and pixel data "bn" after resolution transformation according to the cubic convoluting interpolation method are obtained while utilizing the input data "an", by the following formulae (9) and (10).

$$b5n+1=a4n+1 (n=0, 1, 2 \ldots)$$

$$b5n+2=(1/5)*a4n+1+(4/5)*a4n+2$$

$$b5n+3=(2/5)*a4n+2+(3/5)*a4n+3$$

$$b5n+4=(3/5)*a4n+3+(2/5)*a4(n+1)$$

$$b5n+5=(4/5)*a4(n+1)+(1/5)*a4(n+1)+1 \quad (9)$$

$$b5n+1=a4n+1 (n=0, 1, 2 \ldots)$$

$$b5n+2=(-4/125)*a4n+(29/125)*a4n+1+(116/125)*a4n+2+(-16/125)*a4n+3$$

$$b5n+3=(-12/125)*a4n+1+(62/125)*a4n+2+(93/125)*a4n+3+(-18/125)*a4(n+1)$$

$$b5n+4=(-18/125)*a4n+2+(93/125)*a4n+3+(62/125)*a4(n+1)+(-12/125)*a4(n+1)+1$$

$$b5(n+1)=(-16/125)*a4n+3+(116/125)*a4(n+1)+(29/125)*a4(n+1)+1+(-4/125)*a4(n+1)-2 \quad (10)$$

Although the case at the time of enlargement is explained above, it will be apparently understood that the resolution transforming process can be also executed similarly at the time of reduction.

Further, when 2-dimensional image data is subjected to the resolution transforming process, the 2-dimensional image data is sequentially subjected to the foregoing processes in the horizontal and vertical directions, respectively, thereby enabling the 2-dimensional image data to be subjected to the resolution transforming process.

Further, the processes in the horizontal and vertical directions are performed independently and sequentially and, thus, the 2-dimensional image data can be subjected to the resolution transforming process at magnifications which differ with the horizontal direction and the vertical direction.

Furthermore, when the resolution transforming process is made a process of hardware, it is important which of the resolution transforming process in the horizontal direction and the resolution transforming process in the vertical direction is first executed. In general, the size of FIFO is more decreased in a case where the resolution transforming process in the vertical direction is first executed as compared with the case of first executing the resolution transforming process in the horizontal direction. As a consequence, hardware scale can be decreased.

<Improvement in Image Quality by the Method According to the First Embodiment>

Improvement in image quality caused by the resolution transforming process according to the first embodiment will be described with reference to FIG. 9.

Figure 9:
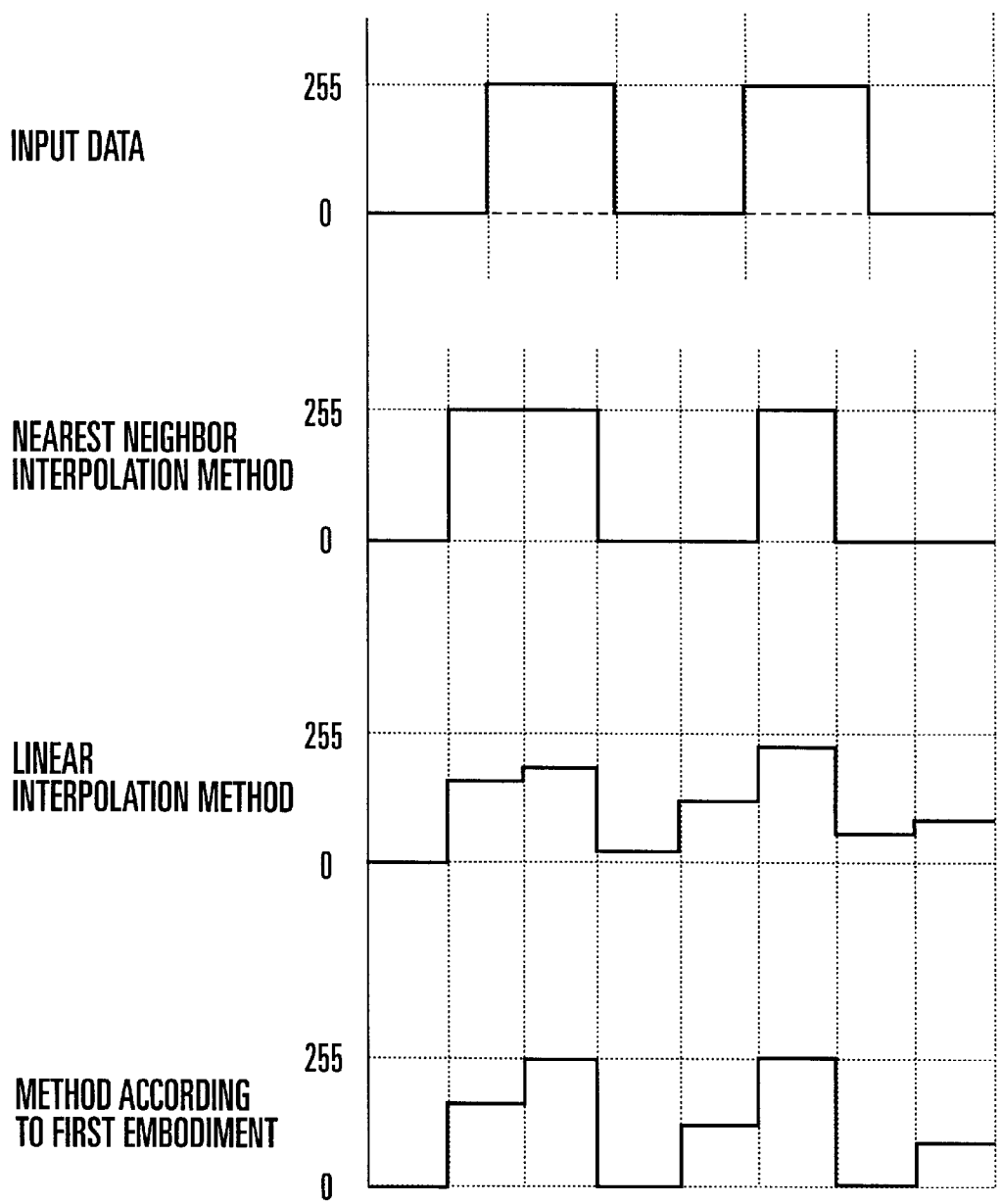
FIG. 9 is a diagram showing the manner of image data based on the interpolating process according to the first embodiment of the invention.

In the case of a stripe pattern of values "0" to "255" as input data with enlargement of the resolution transforming ratio of 1.6, there is caused a noise pattern such that black and white are ununiform, as shown in FIG. 9, if the conventional nearest neighbor interpolation method is used. Further, contrast is lowered, as shown in FIG. 9, if the conventional linear interpolation method is used.

On the contrary, it will be understood that, if the method according to the first embodiment is used, not only the decrease in contrast can be suppressed as much as possible but also the ununiform noise pattern by the nearest neighbor interpolation method can be suppressed.

Second Embodiment

Next, a second embodiment of the invention will be described.

A difference between the first embodiment and the second embodiment will be described.

In the case of the first embodiment, the first and second resolution transforming processes are alternately switched and performed in accordance with the pixel position only at the time of enlargement, and the second resolution transforming process is performed independently of the pixel position at the time of reduction. On the other hand, according to the second embodiment, the first and second resolution transforming processes are alternately switched and performed in accordance with the pixel position irrespective of the time of enlargement and the time of reduction.

It is to be noted that the description of the construction of the resolution transforming circuit 109 according to the second embodiment is omitted because the construction is the same as that shown in FIG. 1B.

Figure 10:
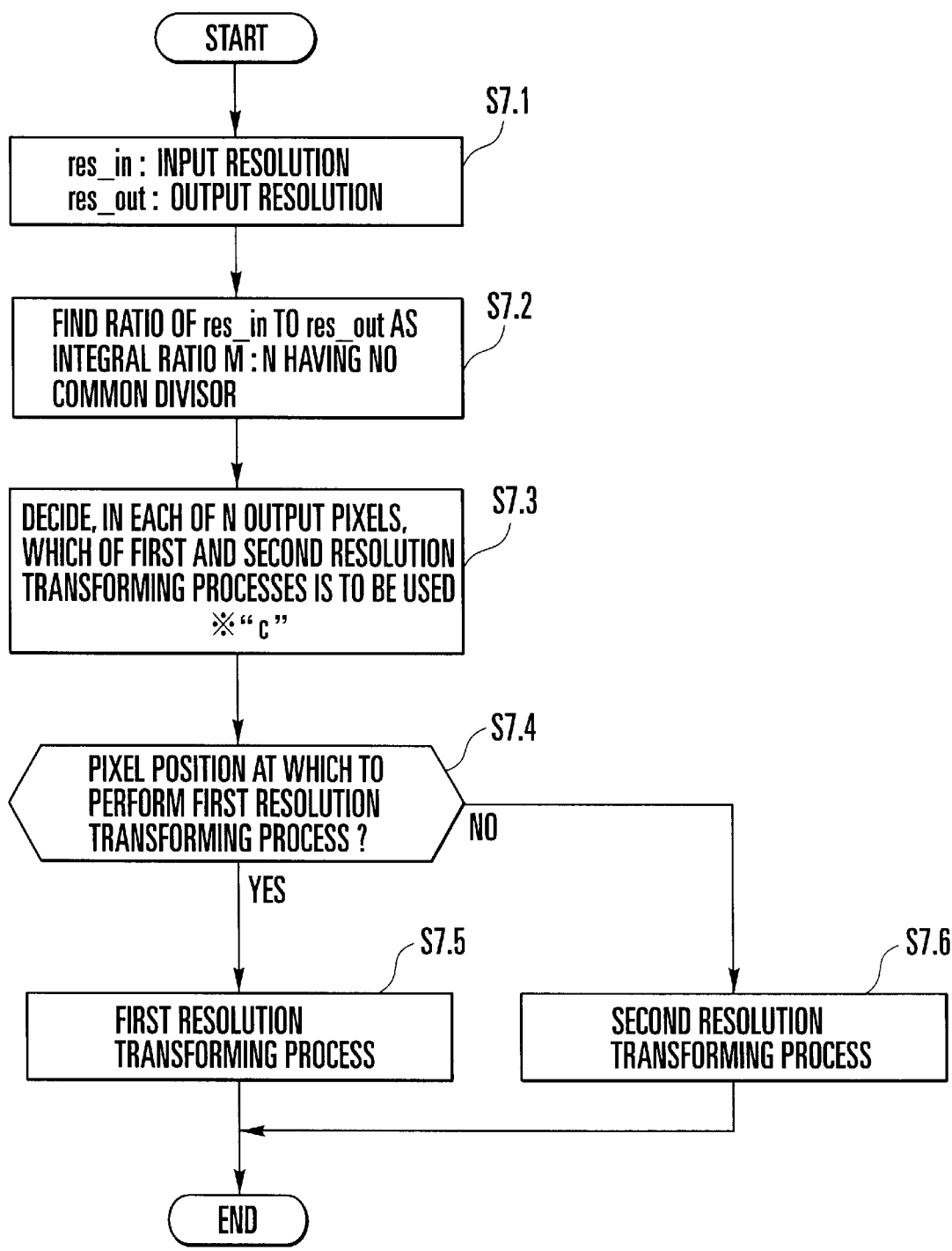
FIG. 10 is a flow chart showing a resolution transforming process according to a second embodiment of the invention.

Next, the resolution transforming process to be performed in the arithmetic operation unit 203 shown in FIG. 1B will be now described in detail with reference to flow charts of FIGS. 10 and 11 and conceptual diagrams of FIGS. 5 and 7.

<Whole Flow>

The resolution of input data (input resolution) stored in the memory 201 and the output resolution after the resolution transforming process are obtained from the system control circuit 115. The input resolution and the output resolution are stored as "res_in" and "res_out", respectively (S7.1). The ratio of "res_in" to "res_out" is obtained as an integral ratio "M:N" having no common divisor (S7.2). The detailed description of the process is omitted since the process is similar to that in the first embodiment.

It is decided which of a first resolution transforming process and a second resolution transforming process, which will be described later, is to be used, in each of N output pixels (S7.3). The detailed description of the deciding process will be explained as a process "c" hereinafter.

If it is decided, in the above-explained deciding process (S7.3), that the output pixel is located at a pixel position where the first resolution transforming process is to be used, the first resolution transforming process is performed (S7.4 and S7.5).

If it is decided, in the above-explained deciding process (S7.3), that the output pixel is located at a pixel position where the second resolution transforming process is to be used, the second resolution transforming process is performed (S7.4 and S7.6).

<Process "c">

Figure 11:
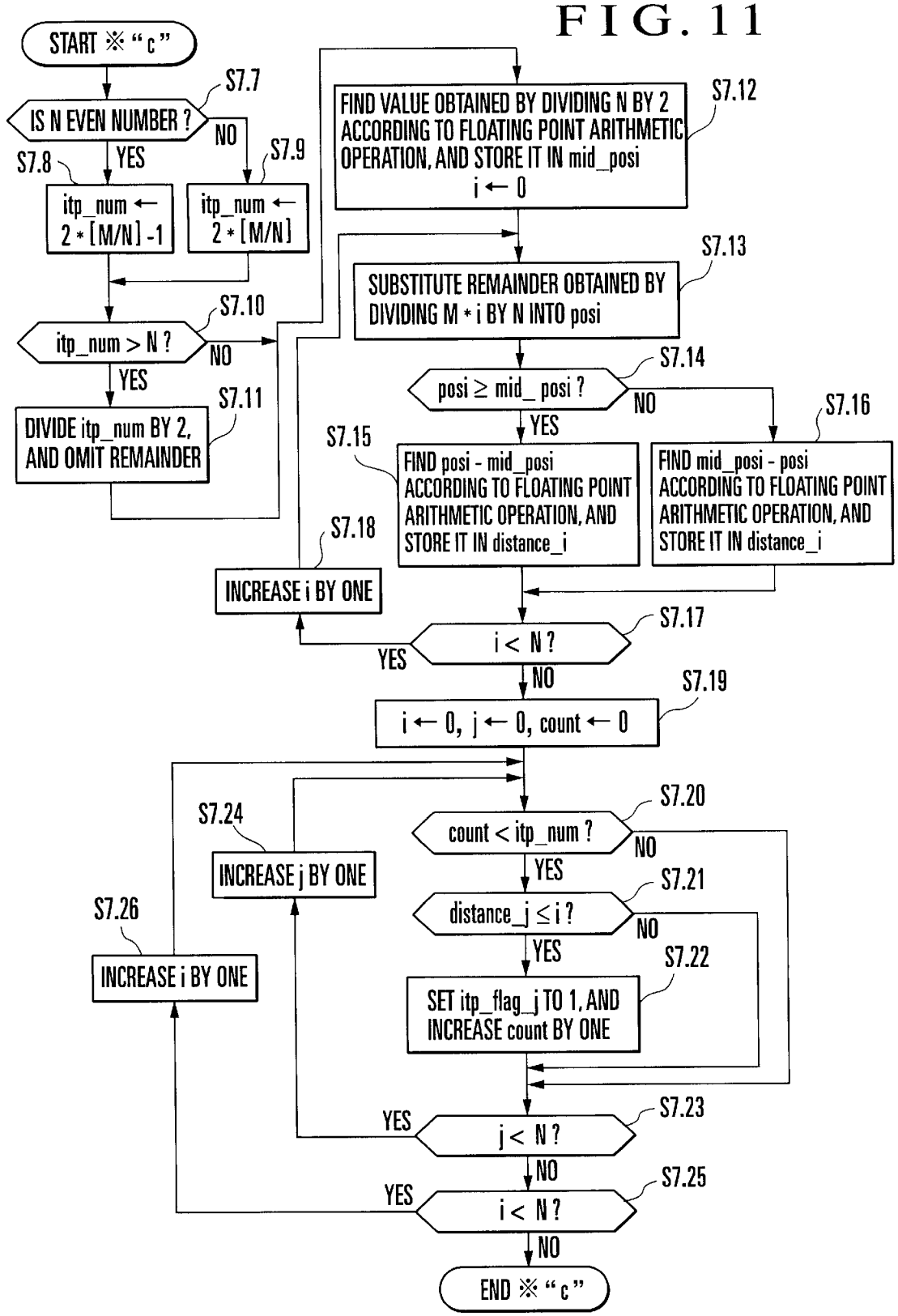
FIG. 11 is a flow chart showing the resolution transforming process according to the second embodiment of the invention.

There will be now described the process for deciding which of the first and second resolution transforming processes is to be used in each of N output pixels (output period), with reference to FIGS. 11, 5, and 7.

First, the gist of the process "c" will be described with reference to the conceptual diagrams of FIGS. 5 and 7.

FIG. 5 is a conceptual diagram for explaining the case of enlargement, and the description of the process in FIG. 5 is omitted since the process is similar to the process mentioned in the first embodiment.

FIG. 7 is a conceptual diagram for explaining the case of reduction. In FIG. 7, a1 to a8 denote input pixels and b1 to b5 denote output pixels. In this process, when an interpolation pixel (output pixel) "b" is located near an input pixel "a", it is determined that the interpolation pixel "b" is a pixel on which the first resolution transforming process is to be performed. Contrarily, when the interpolation pixel "b" is located near a middle position between the input pixels "a" (for example, a1 and a2), it is determined that the interpolation pixel "b" is a pixel on which the second resolution transforming process is to be performed.

In this process, in the case of setting the above N to the output period, the number of pixels to be processed by the first resolution transforming process (hereinafter, referred to as "itp_num") is obtained by the following formulae (11) and (12) in cases where N is equal to an even number and where N is equal to an odd number, respectively (where [ ] denotes a Gaussian symbol indicating that the remainder of division is omitted).

$$\text{itp\_num} = 2*[M/N]-1 \quad \text{(N: even number)} \tag{11}$$

$$\text{itp\_num} = 2*[M/N] \quad \text{(N: odd number)} \tag{12}$$

If "itp_num>N", "itp_num" is divided by "2" and the fraction is omitted, until the relation of "itp_num≦N" is obtained.

Accordingly, the number of pixels to be processed by the second resolution transforming process is equal to "N−itp_num". In the example shown in FIG. 7, "itp_num=2*[8/5]= 2" is obtained, so that two output pixels among the five output pixels are subjected to the first resolution transforming process. In detail, it is determined that three output pixels b1, b3 and b4 are subjected to the first resolution transforming process and two output pixels b2 and b5 are subjected to the second resolution transforming process. Further, in the case of "M=5 and N=2" as an example, "itp_num=[(2*[5/2]−1)/2]=1" is obtained.

As mentioned above, the first resolution transforming process is executed according to the nearest neighbor interpolation method, and the input data is used as it is as much as possible in the enlarging process. Accordingly, blur of the image in the enlarging process can be decreased.

The second resolution transforming process is executed according to the general FIR filtering process using the linear interpolation method or a cubic function. The interval between the pixels in which the high-frequency component is stored by the first resolution transforming process is smoothly interpolated.

The deciding process will be described hereinbelow.

If N is equal to an even number, "2*[M/N]−1" is set to "itp_num" (S7.8). If N is equal to an odd number, "2*[M/N]" is set to "itp_num" (S7.9). If "itp_num>N", "itp_num" is divided by "2" and the fraction is omitted, until the relation of "itp_num≦N" is obtained (S7.11).

The description of the processes in steps S7.12 to S7.25 is omitted since the processes are similar to the processes in steps S2.18 to S2.31 shown in FIG. 4 according to the first embodiment.

The description of the first and second resolution transforming processes is omitted since the processes are similar to that of the first embodiment.

<Improvement in Image Quality by the Method According to the Second Embodiment>

Improvement in image quality caused by the resolution transforming process according to the second embodiment will be described with reference to FIG. 12.

Figure 12:
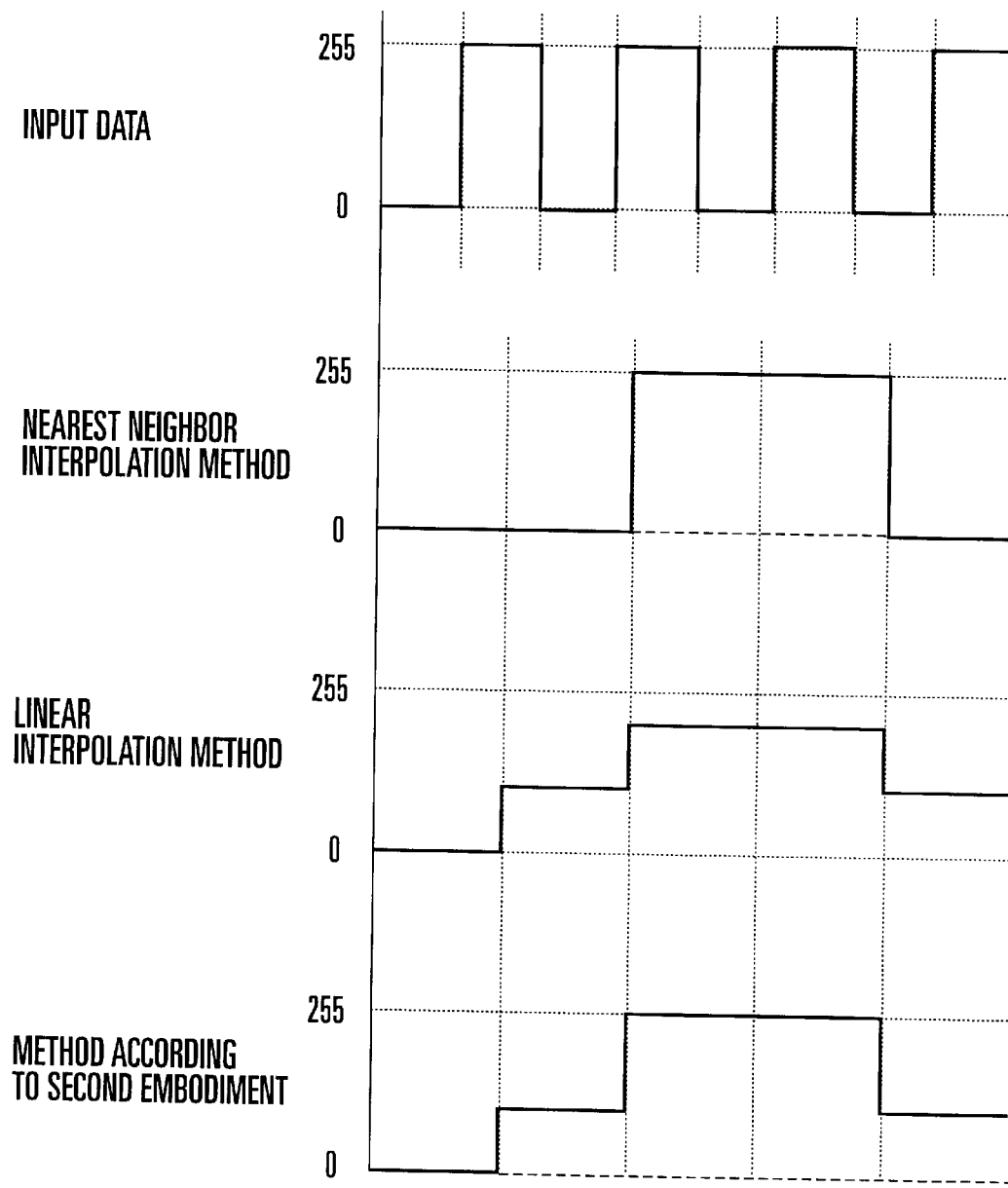
FIG. 12 is a diagram showing the manner of image data based on an interpolating process according to the second embodiment of the invention.

In the case of a stripe pattern of values "0" to "255" as input data with reduction of the resolution transforming ratio of 5/8, there is caused a noise pattern such that black and white are ununiform, as shown in FIG. 12, if the conventional nearest neighbor interpolation method is used. Further, contrast is lowered, as shown in FIG. 12, if the conventional linear interpolation method is used.

On the contrary, it will be understood that, if the method according to the second embodiment is used, not only the decrease in contrast can be suppressed as much as possible but also the ununiform noise pattern by the nearest neighbor interpolation method can be suppressed.

Third Embodiment

Figure 13:
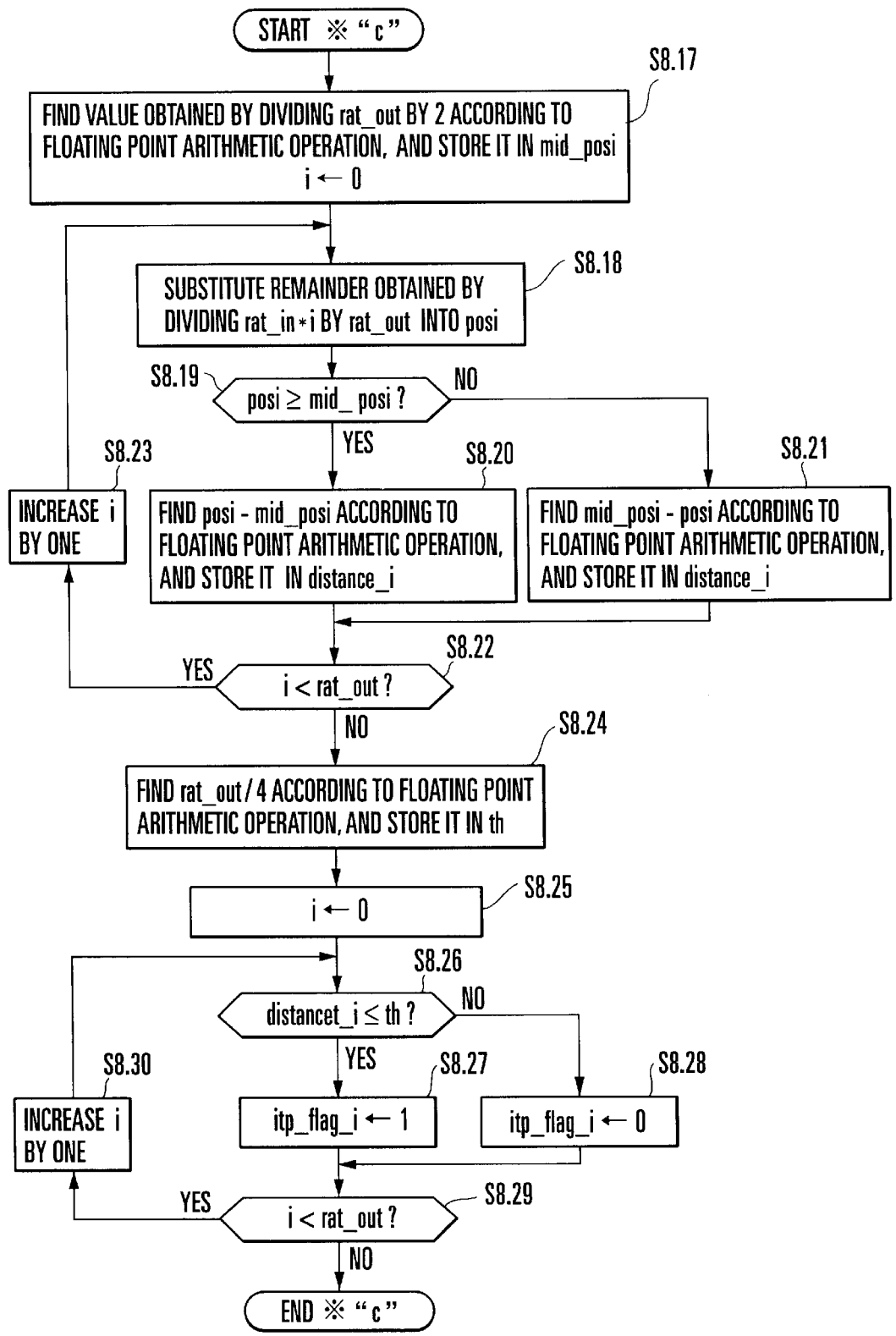
FIG. 13 is a flow chart showing a resolution transforming process according to a third embodiment of the invention.

There will be described a process of deciding which of the first resolution transforming process and the second resolution transforming process is to be used, in each of "rat_out" output pixels (output period), according to the third embodiment with reference to a flow chart of FIG. 13 and a conceptual diagram of FIG. 14.

First, the gist of the third embodiment will be described with reference to the conceptual diagram of FIG. 14. In the third embodiment, an interval between two input pixels "a" located on both sides of an interpolation pixel (output pixel) "b" is divided into four areas (areas A, B, C, and D). When the interpolation pixel "b" is located in the area near the input pixel "a", namely, in the area A or D, the interpolation pixel "b" is determined as a pixel to be subjected to the first resolution transforming process. When the interpolation pixel "b" is located in the area nearer the middle position than the input pixel "a", namely, in the area B or C, the interpolation pixel "b" is determined as a pixel to be subjected to the second resolution transforming process.

In FIG. 14, as an example, it is decided that output pixels b1, b3 and b4 are pixels to be subjected to the first resolution transforming process, and an output pixel b2 is a pixel to be subjected to the second resolution transforming process.

It is to be noted that this deciding process can cope with both enlargement and reduction by the foregoing method.

The deciding process will be described in detail hereinbelow with reference to FIG. 13.

First, the quotient is obtained by dividing "rat_out" by "2" in accordance with the floating-point arithmetic operation (referred to as "mid_posi", S8.17).

The following processes (a) to (c) are repeated until "i" becomes equal to "rat_out" or more (S8.22). Thus, the distance between each of "rat_out" output pixel positions and each middle position between the input pixels on both sides of each output pixel is obtained, respectively, (stored in "distance_i", respectively).

(a) The product of "rat_in" and "i" is divided by "rat_out" and the remainder is obtained (referred to as "posi", S8.18)

(b) The absolute value of a difference value between "posi" and "mid_posi" is obtained by the floating-point arithmetic operation (referred to as "distance_i", where the index "i" denotes an integer value and lies within a range of "0" to "rat_out", S8.19 to S8.21).

(c) If "i" becomes larger than "rat_out", "i" is increased by "1", and the processing routine returns to the operation (a) (S8.23).

Next, "rat_out/4" is obtained by the floating-point arithmetic operation and is stored in "th" (S8.24). A counter "i" is cleared to "0" (S8.25).

Next, "distance_i" of each of "rat_out" output pixels is compared with "th" (S8.26). If "distance_i" is equal to "th" or less, "itp_flag_i" is set (S8.27), thereby deciding the resultant pixel as a pixel to be subjected to the first resolution transforming process. If "distance_i" is larger than "th", "itp_flag_i" is cleared (S8.28), thereby deciding the resultant pixel as a pixel to be subjected to the second resolution transforming process.

According to the third embodiment, both the enlargement and the reduction can be processed by the same method.

A storage medium according to another embodiment of the invention will be now described.

The objects of the invention can be attained by a computer system constructed by a CPU and a memory as well as by a hardware construction. In the case of construction by the computer system, the storage medium according to the invention comprises the above-mentioned memory. That is, there is used the storage medium in which program codes of software for executing the operations mentioned by the flow charts in the foregoing embodiments are stored, for a system or apparatus. The CPU of the system or apparatus reads out the program codes stored in the storage medium and executes the program codes, thereby enabling the objects of the invention to be accomplished.

As the storage medium, it is possible to use a semiconductor memory such as a ROM and a RAM, an optical disk, an magneto-optical disk, a magnetic medium, and the like. Those may be constructed in the form of a CD-ROM, a floppy disk, a magnetic medium, a magnetic card, a non-volatile memory card or the like.

Accordingly, it is possible to realize the functions equivalent to those of the above-mentioned embodiments and obtain the equivalent effects by using the storage medium for a system or apparatus other than the system or apparatus shown in FIG. 1A, reading out the program codes stored in the storage medium by the system or computer and executing the read-out codes. Consequently, the objects of the invention can be attained.

When an OS (operating system) or the like operating on the computer performs a part or all of the processes, or when, after the program codes read out from the storage medium are written to a memory included in an expansion function board installed in the computer or in an expansion function unit connected to the computer, a CPU or the like included in the expansion function board or the expansion function unit, thereafter, performs a part or all of the processes on the basis of the instructions of the program codes, it is also possible to realize the function equivalent to the above-mentioned embodiments, obtain the equivalent effects, and accomplish the objects of the invention.

Although there is described the case where the invention is applied to the digital TV in the above-described embodiments, it is possible to apply the invention to, for instance, resolution transformation in the case of inputting image data from a host computer and displaying the data in addition to the case in the above-described embodiments.

As described above, according to the foregoing embodiments, it is possible to execute the resolution transformation capable of attaining an image having small blur and lessening ununiformity of the line width of text or the like, at an arbitrary magnification irrespective of enlargement and reduction.

What is claimed is:

1. An image processing apparatus for interpolating output image data by using input image data and outputting the interpolated image data, said image processing apparatus comprising:

deciding means for dividing an interval between two input pixels located on both sides of an interpolation pixel of output image data into four areas A, B, C and D which are different from each other, and deciding whether a position of the interpolation pixel is included in the area A or area D near the input pixels or included in the area B area C; and interpolating means for forming the interpolation pixel on the basis of a result of decision made by said deciding means, to obtain the output image data, wherein said interpolating means forms the interpolation pixel, whose position has been decided to be included in the area A or area D, by using a first interpolating process, and forms the interpolation pixel, whose position has been decided to be included in the area B or area C, by using a second interpolating process.

2. An image processing apparatus according to claim 1, wherein the first interpolating process includes a nearest neighbor interpolating process, and the second interpolating process includes a linear interpolating process.

3. An image processing apparatus according to claim 1, wherein the first interpolating process includes a nearest neighbor interpolating process, and the second interpolating process includes a convolution interpolating process.

4. An image processing apparatus according to claim 1, further comprising:

display means for displaying an image represented by output image data outputted from said resolution transforming means.

5. An image processing apparatus according to claim 1, wherein the input image data is image data concerned with a television broadcast.

6. An image processing apparatus for transforming M number of pixels of input image data into N number of pixels (M and N being integers, and M<N) and outputting the transformed image data as output image data, said image processing apparatus comprising:

determining means for determining, among the N number of output pixels, N–M number of pixels which are located near positions of the M number of input pixels; and interpolating means for performing an interpolating process by using the input image data in accordance with an output of said determining means, to obtain the output image data, wherein said interpolating means forms the N number of output pixels determined by said determining means among the M number of output pixels by using a nearest neighbor interpolation method, and forms the N−M number of output pixels by using an interpolation method other than the nearest neighbor interpolation method.

7. An image processing apparatus according to claim 6, wherein the interpolation method other than the nearest neighbor interpolation method includes a linear interpolation method.

8. An image processing apparatus according to claim 6, wherein the interpolation method other than the nearest neighbor interpolation method includes a cubic convoluting interpolation method.

9. An image processing apparatus according to claim 6, wherein the numbers M and N are determined on the basis of a resolution of the input image data and a resolution of the output image data.

10. An image processing apparatus according to claim 9, further comprising:
   display means for displaying an image represented by output image data outputted from said interpolating means, wherein said display means has a flat panel display device and the resolution of the output image data is determined by a display resolution of said flat panel display device.

11. An image processing method for interpolating output image data by using input image data and outputting the interpolated image data, said image processing method comprising:
   a deciding step of dividing an interval between two input pixels located on both sides of an interpolation pixel of output image data into four areas A, B, C and D which are different from each other, and deciding whether a position of the interpolation pixel is included in the area A or area D near the input pixels or included in the area B or area C; and
   an interpolating step of forming the interpolation pixel on the basis of a result of decision made by said deciding step, to obtain the output image data,
   wherein the interpolation pixel whose position has been decided to be included in the area A or area D, is formed by using a first interpolating process, and the interpolation pixel, whose position has been decided to be included in the area B or area C, is formed by using a second interpolating process.

12. An image processing method for transforming M number of pixels of input image data into N number of pixels (M and N being integers, and M<N) and outputting the transformed image data as output image data, said image processing method comprising:
   a determining step of determining, among the N number of output pixels, N−M number of pixels which are located near positions of the M number of input pixels; and
   an interpolating step of performing an interpolating process by using the input image data in accordance with a result of determination made by said determining step, to obtain the output image data,
   wherein the N−M number of output pixels determined by said determining step among the N number of output pixels are formed by using a nearest neighbor interpolation method, and the M number of output pixels are formed by using an interpolation method other than the nearest neighbor interpolation method.

13. A resolution transforming apparatus comprising:
   obtaining means for obtaining an input resolution of an input image data and an output resolution to be obtained after transformation of resolution;
   deciding means for deciding whether an output pixel is located near a middle position between a pair of adjoining input pixels or near one of the adjoining input pixels, and
   arithmetic operation means for obtaining a pixel data of output pixels by selectively performing on the input image data a first resolution transforming process or a second resolution transforming process on the basis of a result of the decision made by said, deciding means.

14. A resolution transforming apparatus according to claim 13,
   wherein a ratio of the input resolution to the output resolution is represented as an integral ratio M:N having no common divisor, and
   wherein, when the numbers M and N are in a relationship of M>N and the value N indicates an output period, a pixel data of M number of output pixels per one output period is obtained by performing the first resolution transforming process and a pixel data of N−M number of output pixels per one output period is obtained by performing the second resolution transforming process.

15. A resolution transforming apparatus according to claim 14,
   wherein a ratio of the input resolution to the output resolution is represented as an integral ratio M:N having no common divisor, and wherein, when the numbers M and N are in a relationship of M>N and the value N indicates the output period, a pixel data of output pixels obtained by performing the first resolution transforming process is obtained by the expression of 2*[M/N]−1 (where [ ] indicates taking only gaussian symbols and a remainder of division is omitted) if the number N is an even number, and
   a pixel data of output pixels obtained by performing the first resolution transforming process is obtained by the expression of 2*[M/N] if the number N is an odd number.

16. A resolution transforming apparatus according to claim 14, wherein said arithmetic operation means obtains a value S by dividing the output resolution by the input resolution in accordance with floating—point arithmetic operation, sequentially multiplies the value S by an integer N in order of increasing N starting with 1, and, when figures below a decimal point of a product of the multiplication C become equal to 0, obtains an integral ratio N:C at that time as an integral ratio of the input resolution to the output resolution having no common divisor.

17. A resolution transforming apparatus according to claim 13, wherein the first resolution transforming process is performed by using a nearest neighbor interpolation method.

18. A resolution transforming apparatus according to claim 13, wherein the second resolution transforming process is performed by using a linear interpolation method or a cubic convoluting interpolation method.

19. A resolution transforming apparatus according to claim 13, wherein the first resolution transforming process is performed by using a nearest neighbor interpolation method and the second resolution transforming process is performed by using a linear interpolation method or a cubic convoluting interpolation method.

20. A resolution transforming apparatus according to claim 13, wherein, when the output resolution is larger than the input resolution, a pixel data of output pixels is obtained by selectively performing the first resolution transforming process or the second resolution transforming process on the input image data on the basis of a result of the decision made by said deciding means, and when the input resolution is larger then the output resolution, a pixel data of output pixels is obtained by performing the second resolution transforming process on the input image data.

21. A resolution transforming apparatus according to claim 13, wherein, when the output resolution is larger or smaller than the input resolution, a pixel data of output pixels is obtained by selectively performing the first resolution transforming process or the second resolution transforming process on the input image data on the basis of a result of the decision made by said deciding means.

22. A resolution transforming method comprising the steps of:

obtaining an input resolution of an input image data and an output resolution to be obtained after transformation of resolution;

deciding whether an output pixel is located near a middle position between a pair of adjoining input pixels or near one of the adjoining input pixels, and obtaining a pixel data of output pixels by selectively performing a first resolution transforming process or a second resolution transforming process on the input image data on the basis of a result of the decision made by said deciding step.

23. A resolution transforming process according to claim 22, wherein the first resolution transforming process is performed by using a nearest neighbor interpolation method.

24. A resolution transforming process according to claim 22, wherein the second resolution transforming process is performed by using a linear interpolation method or a cubic convoluting interpolation method.

25. A resolution transforming process according to claim 22, wherein the first resolution transforming process is performed by using a nearest neighbor interpolation method and the second resolution transforming process is performed by using a linear interpolation method or a cubic convoluting interpolation method.

26. A resolution transforming program for executing a resolution transforming process comprising the steps of:

obtaining an input resolution of an input image data and an output resolution to be obtained after transformation of resolution;

deciding whether an output pixel is located near a middle position between a pair of adjoining input pixels or near one of the adjoining input pixels, and obtaining a pixel data of output pixels by selectively performing a first resolution transforming process or a second resolution transforming process on the input image data on the basis of a result made by said deciding step.

27. A resolution transforming program according to claim 26, wherein the first resolution transforming process is performed by using a nearest neighbor interpolation method.

28. A resolution transforming program according to claim 26, wherein the second resolution transforming process is performed by using a linear interpolation method or a cubic convoluting interpolation method.

29. A resolution transforming program according to claim 26, wherein the first resolution transforming process is performed by using a nearest neighbor interpolation method and the second resolution transforming process is performed by using a linear interpolation method or a cubic convoluting interpolation method.

30. A resolution transforming apparatus comprising:

dividing means for dividing an interval between two input pixels into four areas A, B, C and D which are different from each other;

deciding means for deciding whether a position of an output pixel is included in the area A or area D near the input pixels or included in the area B or area C near a middle position between the input pixels;

first transforming means for performing a first resolution transforming process on the input pixel by using a nearest neighbor interpolation method to obtain an output pixel data decided to be included in the area A or area D; and second transforming means for performing a second resolution transforming process on the input pixel by using a linear interpolation method or a cubic convoluting interpolation method.

31. A resolution transforming method comprising:

a dividing step of dividing an interval between two input pixels into four areas A, B, C, and D which are different from each other, a deciding step of deciding which of a first resolution transforming process and a second resolution transforming process is to be used for obtaining a pixel data;

wherein, when a position of an output pixel is included in the area A or area D near the input pixels, the first resolution transmitting process by using a nearest neighbor interpolation method is decided to perform to obtain the pixel data, and when a position of the output pixel is included in the area B or area C near a middle position between the input pixels, the second resolution transforming process by using a linear interpolation method or a cubic convoluting interpolation method is decided to perform to obtain the pixel data; and a resolution performing step of performing the first resolution transforming process or the second resolution transforming process on the input pixel on the basis of a result of the decision made by said deciding step.

32. A resolution transforming program for executing a resolution transforming process comprising:

a dividing step for dividing an interval between two input pixels into four areas A, B, C and D which are different from each other, a deciding step for deciding whether a position of an output pixel is included in the area A or area D near the input pixels or included in the area B or area C near a middle position between the input pixels;

a first transforming step for performing a first resolution transforming process on the input pixel by using a nearest neighbor interpolation method to obtain the output pixel data decided to be included in the area A or area D; and a second transforming step for performing a second resolution transforming process on the input pixel by using a linear interpolation method or a cubic convoluting interpolation method.

33. A resolution transforming method comprising obtaining step at obtaining an input resolution of an input image data and an output resolution to be obtained after transformation of resolution;

deciding step of deciding whether an output pixel is located near a middle position between a pair of adjoining input pixels or near one of the adjoining input pixels, and arithmetic operation step of obtaining a pixel data of the output pixel on the basis of a result of the decision made by said deciding step, wherein, when an output pixel is located near one of the pair of adjoining input pixels, the pixel data of the input pixel has the same value as the pixel data of the output pixel, when an output pixel is located near a middle position between a pair of adjoining input pixels, the pixel of the output pixel is obtained by performing a resolution transforming process on the input pixel in accordance with a method other than a nearest neighbor interpolation method.

34. A resolution transforming method according to claim 33, wherein said resolution transforming process is performed by using a linear interpolation method or a cubic convoluting interpolation method.

35. A resolution transforming program for performing said resolution transforming method according to claim 33.

* * * * *